United States Patent [19]

Mohr, III

[11] 3,852,739

[45] Dec. 3, 1974

[54] MOVEMENT DETECTING AND VISUAL INDICATING DEVICE

[76] Inventor: Henry G. Mohr, III, 1418 N. Center St., Orange, Calif. 92667

[22] Filed: June 29, 1973

[21] Appl. No.: 375,114

[52] U.S. Cl............. 340/347 AD, 33/1 M, 33/125, 74/89.21
[51] Int. Cl..................... H03k 13/00, G01b 3/00
[58] Field of Search.............. 33/1 M, 12 S, 1 PT; 340/347 AD; 235/61.6 A; 74/89.21

[56] References Cited
UNITED STATES PATENTS

| | | | |
|---|---|---|---|
| 2,276,302 | 3/1942 | Guttmann | 33/125 |
| 2,293,730 | 8/1942 | Guttmann | 33/125 |
| 2,293,732 | 8/1942 | Guttmann | 33/125 |
| 3,665,608 | 5/1972 | Stockebrand | 33/1 M |

Primary Examiner—Eugene G. Botz
Assistant Examiner—Vincent J. Sunderdick

[57] ABSTRACT

A device for detecting and indicating the degree of movement of a movable portion of a machine by the degree of rotation of a drum that moves longitudinally relative to a tensioned elongate member. The rotation of the drum is on an axis that is normal relative to the longitudinally extending elongate tension member.

The degree of rotation of the drum is detected by an encoder, which encoder by conventional means transvers the detected information to a conventional digital read-out device that visually indicates the extent of movement of the movable portion of the machine relative to the tensioned elongate member.

9 Claims, 10 Drawing Figures

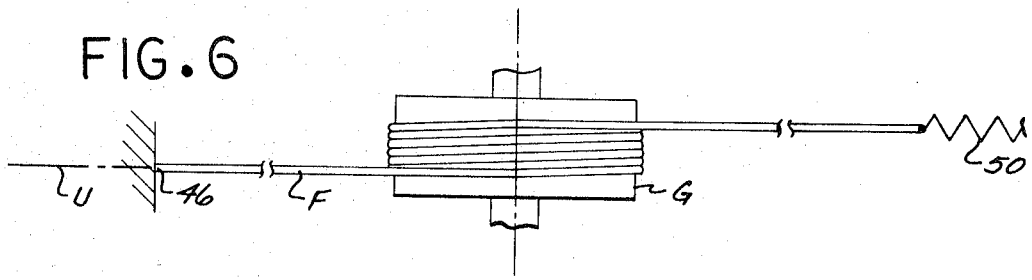
FIG. 6
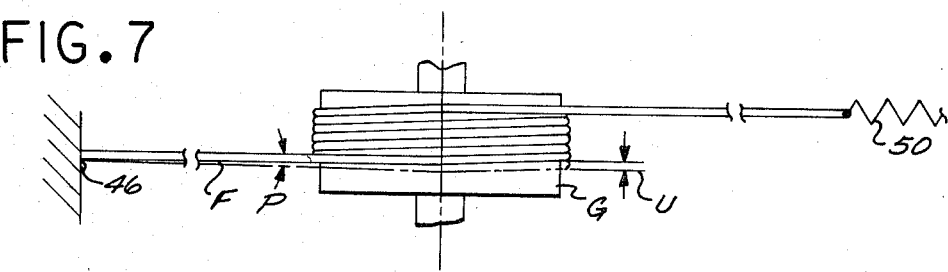
FIG. 7
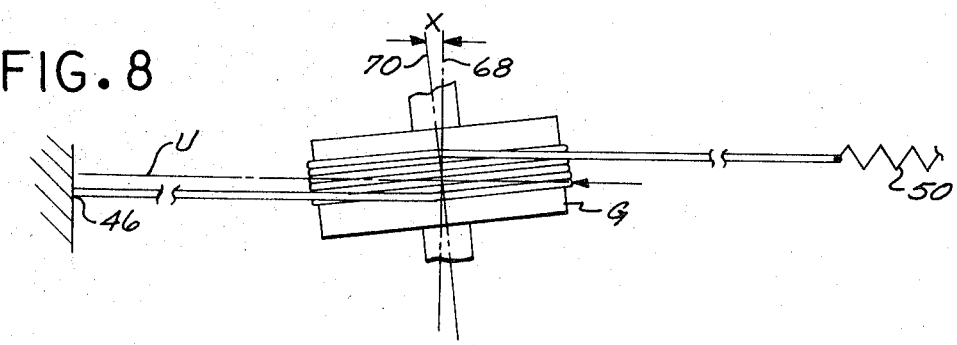
FIG. 8
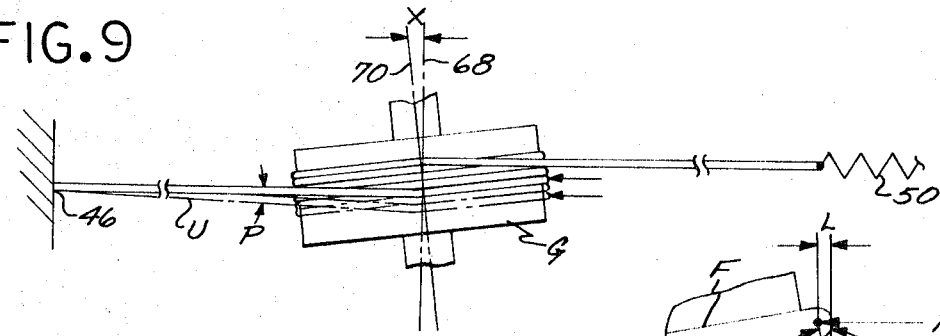
FIG. 9
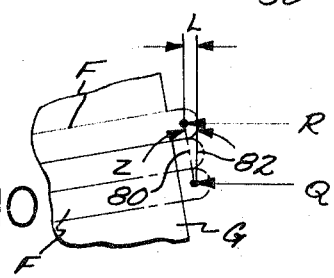
FIG. 10
FIG. 11
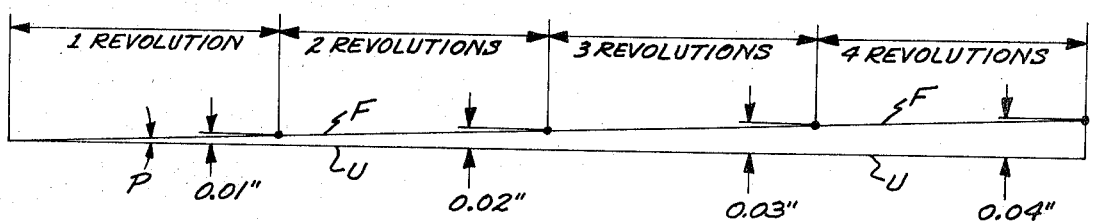

3,852,739

MOVEMENT DETECTING AND VISUAL INDICATING DEVICE

BACKGROUND OF THE INVENTION

1. Field of the Invention

Movement detecting and visual indicating device.

2. Description of the Prior Art

In the past, it has been common practice to employ a precision rack and pinion system to record the movement of a carriage or other movable element relative to the stationary portion of a machine of which the carriage or movable portion is a part. Such rack and pinion systems have operational disadvantages, one of which is the initial expense thereof, that is substantially overcome by the present invention.

The primary purpose in devising the present invention is to supply a relatively simple system for detecting movement and the extent thereof of a carriage or other movable element relative to the stationary portion of the machine of which it forms a part.

Another object of the invention is to provide a relatively inexpensive movement detecting the visual indicating device that may be fabricated from standard commerically available materials and components, is simple to install and use, requires a minimum of maintenance attention, and may be sold at a sufficiently low price as to permit the use thereof on precision machines in which it is desirable or necessary to have knowledge of the degree of movement of a carriage or other movable element forming a part thereof.

SUMMARY OF THE INVENTION

In combination with a machine that includes a carriage or other element that moves in a straight path relative to the stationary portion of the machine, a tensioned wire that extends along said path. The carriage or other movable portion of the machine rotatably supports a drum having at least one hardened and ground exterior cylindrical surface on which a number of wraps of the wire are wound and in excess to the number of wraps that are required for the drum to traverse the longitudinal path on the machine. At least a portion of the wraps on the drum at all times remain in a first position relative thereto.

As the carriage or movable element of the machine moves, the drum rotates as it moves longitudinally relative to the tensioned wire, with the degree of rotation of the drum and the direction of movement thereof relative to the machine being detected by a conventional encoder that occupies a fixed position relative to the drum. The encoder transmits information to a conventional digital read-out device to permit said read-out device to visually indicate the degree of movement of the carriage or movable element, as well as the direction thereof.

BRIEF DESCRIPTION OF THE DRAWINGS

FIG. 6 is a side elevational view of the drum in a vertical position;

FIG. 7 is the same side elevational view of the drum as shown in FIG. 6 but after the drum has moved to the right and rotated one revolution from the position shown in FIG. 6, and with the wire being at a pitch angle P with the horizontal;

FIG. 8 is a side elevational view of the drum tilted at an angle X with the vertical;

FIG. 9 is the same side elevational view of the drum as shown in FIG. 8 but after it has advanced to the right a distance to cause two revolutions thereof;

FIG. 10 is a fragmentary side elevational view of the drum and wire which illustrates that as the tilted drum rotates a phantom line drawn through the centers of the wire wraps furthest to the right makes an angle M with the vertical and the wire F shown in FIG. 11 that is the hypotenuse of a triangle 1, 2 and 3 to become shorter by a distance L; and FIG. 11 is a chart showing the angular position the lower stretch of wire assumes as it unwinds from the drum.

DESCRIPTION OF THE PREFERRED EMBODIMENT

Figure 1:
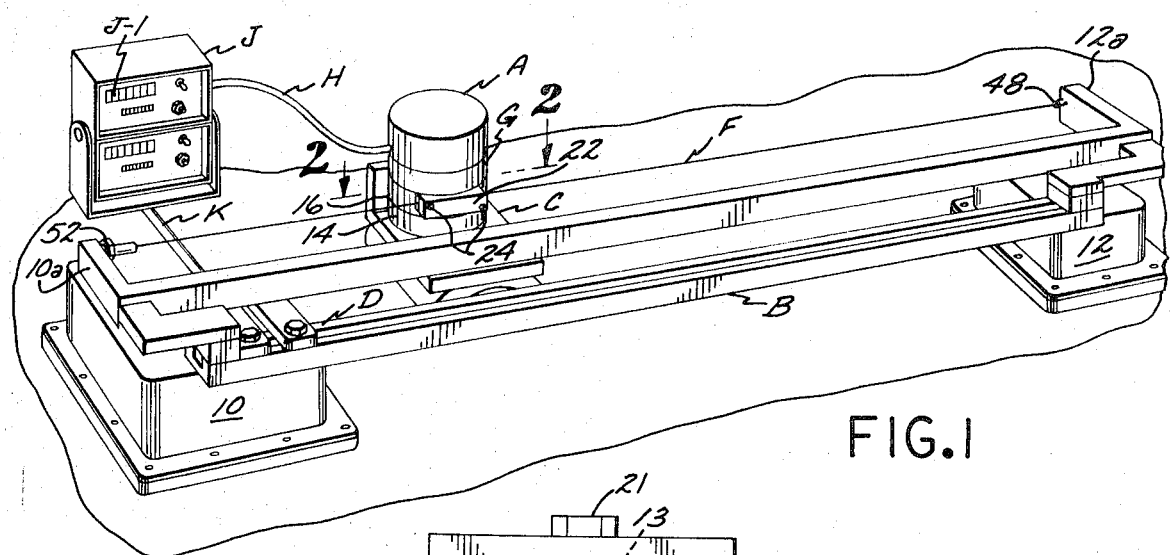
FIG. 1 is a perspective view of the invention installed on a machine that has a carriage that moves in a straight path.

The movement detecting and visual indicating device A as shown in FIG. 1 may be used on any machine B that has a carriage or movable element C that moves in a straight path thereon. The machine B is illustrated in FIG. 1 as including an elongate bed D that is supported on first and second end pieces 10 and 12 respectively. Each of the end pieces 10 and 12 has a portion 10a and 12a extending upwardly therefrom.

A housing assembly Y which includes a base portion 14 is preferably supported in an adjustable tilted position above the carriage C by an L-shaped bracket 13 that has a first horizontal arm 15 secured to the carriage by conventional means such as bolts 17, or the like. The bracket 13 includes an upwardly extending second arm 19 from which a base portion 14 of the housing assembly Y is adjustably and pivotally supported. Such adjustable support is conveniently achieved by a horizontal threaded bolt 21 that extends transversely through an opening 23 in second arm 19 to engage a horizontal tapped recess 25 formed in base portion 14. When bolt 21 is rotated in an appropriate direction, the housing portion 14 is drawn into frictional binding contact with the second arm 19 at a desired angle for reasons that will later be explained.

Figure 3:
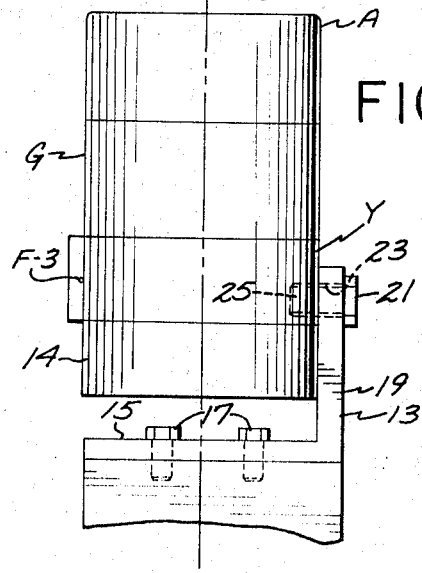
FIG. 3 is a side elevational view of the drum-supporting portion of the device, taken normal relative to the direction of movement of the carriage and illustrating the supporting bracket that permits the axis of rotation of the drum to be adjusted relative to the vertical.
Figure 4:
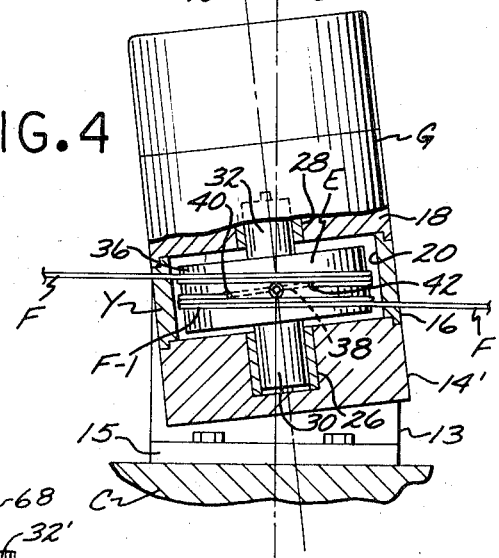
FIG. 4 is a combined vertical cross-sectional and side elevational views of the drum-supporting portion of the device supported at a fixed position on the carriage with the axis of rotation of the drum being illustrated at an exaggerated angle with the vertical.

In FIG. 4 the base portion 14' is shown as being mounted at a fixed position on the carriage C by conventional means and at an angle relative to the vertical. The housing assembly Y, as shown in FIGS. 3 and 4, is identical other than as to the particular means employed in supporting it from the carriage C. The housing assembly Y has a cylindrical side wall 16 that extends upwardly from the base portion 14, and the side wall 16 is removably engaged by an upper housing portion 18. The base portion 14, side wall 16 and upper housing portion 18 are removably secured together by conventional means (not shown). The side wall 16 has an opening 20 formed therein as shown in FIG. 4, with this opening being closed by a cover plate 22 illustrated in FIG. 1 that is held in spaced relationship from the cylindrical side wall by bolts 24 or other suitable supporting means. The base 14 and upper portion 18 of the housing have axially aligned recesses formed therein in which suitable precision bearings 26 and 28 are mounted, which bearings may be seen in FIG. 4.

Figure 2:
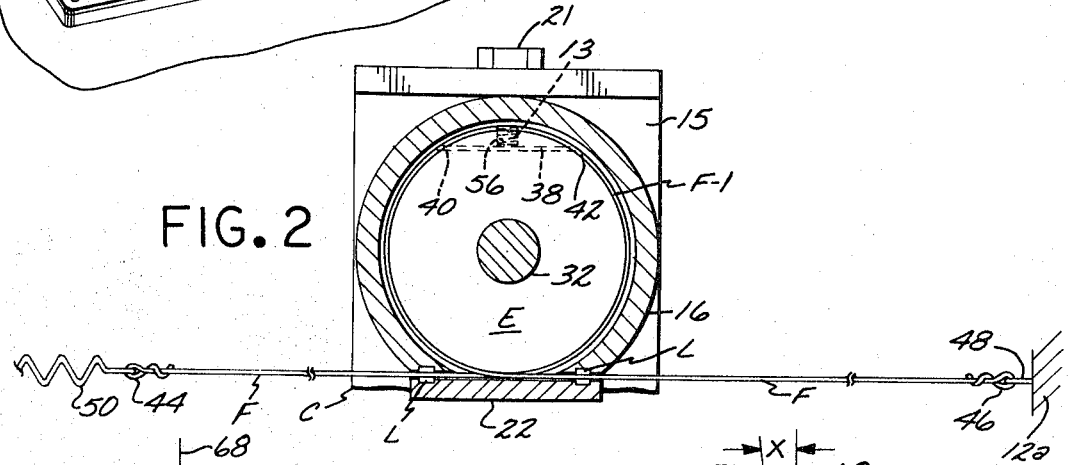
FIG. 2 is a transverse cross-sectional view of the drum-supporting portion of the invention, taken on the line 2—2 of FIG. 1.

The bearings 26 and 28 rotatably support two stub shafts 30 and 32 that are secured to opposite sides of a drum E that has a precision hardened and ground cylindrical surface 36. The drum E has a passage 38 formed therein that has first and second ends 40 and 42, best seen in FIG. 2. A length of resilient piano wire F is provided that has first and second loops 44 and 46 formed on the first and second ends thereof as shown in FIG. 2. The second loop 46 is secured to an eye bolt 48, or other suitable securing means that is rigidly affixed to the second end portion 12a as illustrated in FIGS. 1 and 2. The first loop 44 is secured to a tensioned helical spring 50 that is affixed to a manually adjustable support 52 of conventional design that is secured to the first end piece portion 10a. By manipulation of the support 52, the spring 50 can be caused to move towards or away from the second end piece portion 12a to vary the tension on the wire F.

The wire F has a number of wraps F-1 thereof extending around the surface 36 of the drum E, and with the centrally disposed one of these wraps extending through the passage 38. A set screw 54 engages a tapped bore 56 formed in the drum E, as can be seen in FIG. 2, and the set screw when tightened, bears against that portion of the wire F which extends through the passage 38 to hold the wire in a nonmovable position relative thereto. When the carriage C is centrally disposed on the bed B, the first and second portions of the wire F extend oppositely from the drum E and are of equal length, and are secured to the spring 50 and eye bolt 48.

The spring 50 is at all times in tension, and maintains the wire F in a tensioned position, and extends longitudinally along the path of the machine B that is traversed by the carriage C. When the carriage C is moved longitudinally along the bed B, by means not shown, the drum E rotates, and portions of the wire F are wound thereon and unwound therefrom. The number of wraps of wire F-1 is substantially greater, and preferably not less than three, than that required for the carriage C to traverse the full length of the bed B.

As the carriage C moves longitudinally along the bed B, the drum E rotates, and in so doing rotates the shaft 32 that actuates an encoder G of conventional design, with this encoder in turn transmitting electrical impulses through a cable H to an electrically actuated read-out device J of conventional design that is supported by a bracket means K from the machine B as illustrated in FIG. 1. The encoder G is mounted on the upper portion 18 by conventional means (not shown). The read-out device J has visual indicating means J-1 that not only indicate movement of the carriage C on the bed B, but the magnitude of such movement, as well as the direction thereof.

The device J, as is conventional with such devices, may be reset to any zero position when the carriage C is at any elected position on the bed B. To prevent small particles of dust or other foreign material from being carried onto the surface 36 of the drum E, resilient pads L are preferably mounted between the cover plate 22 and the cylindrical side wall 16, as shown in FIG. 2.

Figure 5:
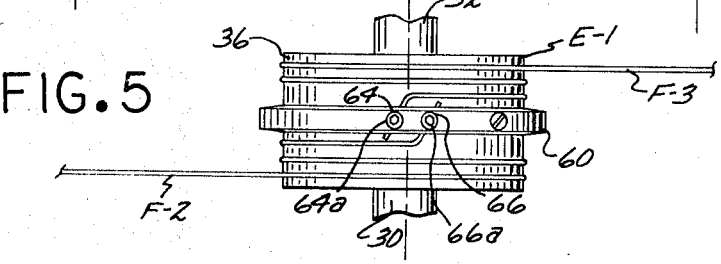
FIG. 5 is a side elevational view of an alternate form of drum.

An alternate form of drum E-1 is shown in FIG. 5 that is secured to two stub shafts 30' and 32' that are mounted in the base portion 14 and upper portion 18 of the housing in the same manner as described in connection with the drum E. The alternate form of drum E-1 does not have the passage 38 formed therein, but instead a ring 60 is slidably mounted thereon and held in a fixed centered position thereon by a set screw 62.

When the alternate form of drum E-1 is used, the wire portions F-2 and F-3 are separate sections of wire, wraps of which are extended around the drum E on opposite sides of the ring 60, as shown in FIG. 4, and with end portions extending through transverse bores 64 and 66 formed in the ring 60 and rigidly held therein by set screws 64a and 66a. The invention when the alternate form of drum E-1 is used therewith, operates in the same manner as the form of the invention first described. Irrespective of whether the housing assembly Y is supported from the carriage C as shown in FIG. 3, or as illustrated in FIG. 4, or whether drum E or E-1 is employed, it is desirable that the axis of rotation 68 of the drum be at a vertical angle X relative to a vertical axis 70, as shown in FIG. 4. The angle X, which will normally be between 1° and 5°, is in a plane parallel to the wire F on opposite sides of the drum E. Due to this tilting of the drum E, the wire F as it winds and unwinds from the drum E, at all times tends to move to the center of the drum. When the form of the invention shown in FIG. 3 is employed, the drum E can be adjusted to the minimum angle X to achieve the desired result. It will be obvious that when the form of the invention illustrated in FIG. 4 is used, the angle X must be predetermined and cannot be varied without the use of auxiliary equipment such as shims, or the like.

In FIG. 6 it will be seen that the stretch of wire F to the left of the drum G is substantially parallel to the horizontal line U prior to the drum rotating and moving to the right to the position shown in FIG. 6. When the drum G reaches the position illustrated in FIG. 7 the stretch of wire F to the left of the drum G now makes an angle P with the horizontal line U, with the same situation being illustrated in FIGS. 8 and 9 when the drum G is tilted at an angle X with the vertical line 68. The angularly positioned stretch of wire F to the left of the drum G in both FIGS. 7 and 9 is greater than the horizontal component thereof, and would result in an error in the measurement of horizontal distances as the drum G is moved to determine such distances. Angle P is substantially the same in both FIGS. 7 and 9.

In FIG. 10 it will be seen that as the wraps of wire F move upwardly on the tilted drum G from the position shown in phamton line to that illustrated in solid line a line 80 drawn through the centers of the wraps will make an angle Z with a vertical line 82 drawn through the center of the lowermost wrap. The horizontal distance between the uppermost portions of lines 80 ad 82 is L, and as this distance L is in a direction opposite to that in which the stretch of wire F to the left of drum G is being angularly positioned, they compensate for one another, and the drum is rotated to give a true reading of the horizontal distance that the carriage C on which it is mounted moves.

In FIG. 11 a chart is shown in which the drum G is assumed to have a circumference of 3.00 inches and the wire F a diameter of 0.01 inch. The wire F makes an angle P with the horizontal line U. In FIG. 11 it will be seen that the wire F at the end of one, two, three and four revolutions of the drum Ghas risen 0.01 inch, 0.02 inch, 0.03 inch and 0.04 inch respectively thereon as the wire assumes an angular position, which is compensated for by tilting the drum G to the angle X as above described.

The use and operation of the invention has been described in detail previously, and need not be repeated.

I claim:

1. In combination with a machine having a movable element that traverses a straight path between first and second upwardly extending portions of said machine, a device for indicating the the extent of movement of said element in traversing said path, said device including:
   a. an elongate resilient member having first and second ends;
   b. first tensioned spring means that secure said first end to said first upwardly extending portion;
   c. second means for securing said second end to said second upwardly extending portion, with said first and second means cooperatively holding said resilient member in a tensioned condition parallel to said path;
   d. a cylindrical drum rotatably supported relative to said element, with said drum having a plurality of wraps of said resilient member extending therearound;
   e. third means for maintaining a centrally disposed one of said wraps in a non-movable position relative to said drum which third means includes a tapped bore which extends into said drum to communicate with a passage that extends through said drum and in which passage a section of a center wrap of said resilient member is disposed, and a set screw in engagement with said tapped bore, which set screw when tightened frictionally engages said section of said center wrap to prevent said center wrap from moving relative to said drum.

2. The combination as defined in claim 1 in which said fourth means is an encoder that occupies a fixed position relative to said drum and movable element, and said encoder includes an electrical conducting cable that extends from said encoder to said read-out device.

3. The combination as defined in claim 2 that further includes:
   h. fifth means for supporting said read-out device at a fixed position on said machine.

4. The combination as defined in claim 2 wherein said encoder and read-out device are of such structure that said read-out device not only indicates the magnitude of movement of said movable element but the direction of said movement as well.

5. The combination as defined in claim 1 which further includes:

h. a housing assembly in which said drum is rotatably supported and rotates on an upwardly extending axis of rotation; and
   i. fifth means for so supporting said housing from said element that said axis of rotation is at an angle relative to the vertical and in a plane parallel to said wire on each side of said drum, with said angle being sufficiently great as to cause said wire as it wraps on said drum to at all times tend to move towards the center of the drum.

6. The combination as defined in claim 5 wherein said fifth means is a bracket supported at a fixed position on said element and said bracket pivotally and adjustable supports said housing assembly therefrom.

7. The combination as defined in claim 5 which further includes:
   j. sixth means for removing foreign material from said wire prior to said wire wrapping on said drum.

8. In combination with a machine having a movable element that traverses a straight path between first and second upwardly extending portions of said machine, a device for indicating the extent of movement of said element in traversing said path, said device including:
   a. an elongate resilient member having first and second ends, said resilient member including first and second sections that have said first and second ends, with said first and second sections having third ends;
   b. first tensioned spring means that secure said first end to said first upwardly extending portion;
   c. second means for securing said second end to said second upwardly extending portion, with said first and second means cooperatively holding said resilient member in a tensioned condition parallel to said path;
   d. a cylindrical drum rotatably supported relative to said element, with said drum having a plurality of wraps of said resilient member extending therearound;
   e. third means that include a ring that is centrally disposed on the exterior surface of said drum and in snug engagement therewith, with a plurality of wraps of said first and second sections extending around said drum on opposite sides of said ring;
   f. fourth means for holding said ring in a fixed position on said drum;
   g. fifth means for securing said third ends of said first and sections to said ring;
   h. a digital read-out device; and
   i. sixth means operatively associated with said drum for electrically signaling to said read-out device the extent of rotation of said drum as said drum and movable element move longitudinally relative to said tensioned resilient member to permit said read-out device to indicate the magnitude of said movement.

9. The combination as defined in claim 8 wherein said fifth means are first and second set screws mounted on said ring that when tightened, frictionally engage said third ends of said first and second sections to hold said third ends at fixed positions relative to said drum.

* * * * *